United States Patent [19]
Li

[11] Patent Number: 6,120,048
[45] Date of Patent: *Sep. 19, 2000

[54] AUXILIARY STEERING ASSEMBLY FOR A TRICYCLE

[76] Inventor: Hsing Li, 17, Yung Hsing Street, Taichung, Taiwan

[*] Notice: This patent is subject to a terminal disclaimer.

[21] Appl. No.: 08/984,534

[22] Filed: Dec. 3, 1997

[51] Int. Cl.⁷ .................................................. B62B 3/12
[52] U.S. Cl. .......................................... 280/270; 280/282
[58] Field of Search .................................... 280/282, 292, 280/293, 263, 270, 288.4, 304.5, 47.11, 62, 774

[56] References Cited

U.S. PATENT DOCUMENTS

| D. 332,591 | 1/1993 | Reely | D12/129 |
|---|---|---|---|
| 364,335 | 6/1887 | Burdess | 280/271 |
| 638,112 | 11/1899 | Graham | 280/270 |
| 667,154 | 1/1901 | McDonald | 280/293 |
| 1,082,122 | 12/1913 | Hill | 280/270 |
| 1,132,771 | 3/1915 | Handy | 280/270 |
| 1,933,955 | 11/1933 | Arnold | 280/270 |
| 2,645,505 | 7/1953 | Durand | 280/288.4 |
| 2,672,351 | 3/1954 | Kane | 280/288.4 |
| 2,816,775 | 12/1957 | Costello | 280/282 |
| 3,237,961 | 3/1966 | McMullen | 280/270 |
| 3,411,276 | 11/1968 | DeBuigne | 280/124 |
| 3,485,507 | 12/1969 | Christof | 280/202 |
| 3,645,558 | 2/1972 | McMullen | 280/270 |
| 5,904,363 | 5/1999 | Li | 280/282 |
| 5,924,713 | 7/1999 | Li | 280/270 |

FOREIGN PATENT DOCUMENTS

| 40776 | 3/1887 | Germany . |
|---|---|---|
| 9595 | 4/1896 | United Kingdom . |
| 17629 | 9/1901 | United Kingdom . |

*Primary Examiner*—Kevin Hurley
*Assistant Examiner*—Andrew J. Fischer
*Attorney, Agent, or Firm*—Bacon & Thomas, PLLC

[57] ABSTRACT

A tricycle is provided with an auxiliary steering device capable of manipulating the steering of the handlebars of the tricycle. The device is mounted on the rear end of the rear frame of the tricycle such that the device is connected with the handlebars of the tricycle by two connection rods. The steering of the handlebars of the tricycle is manipulated by turning the auxiliary steering device leftwards or rightwards.

1 Claim, 5 Drawing Sheets

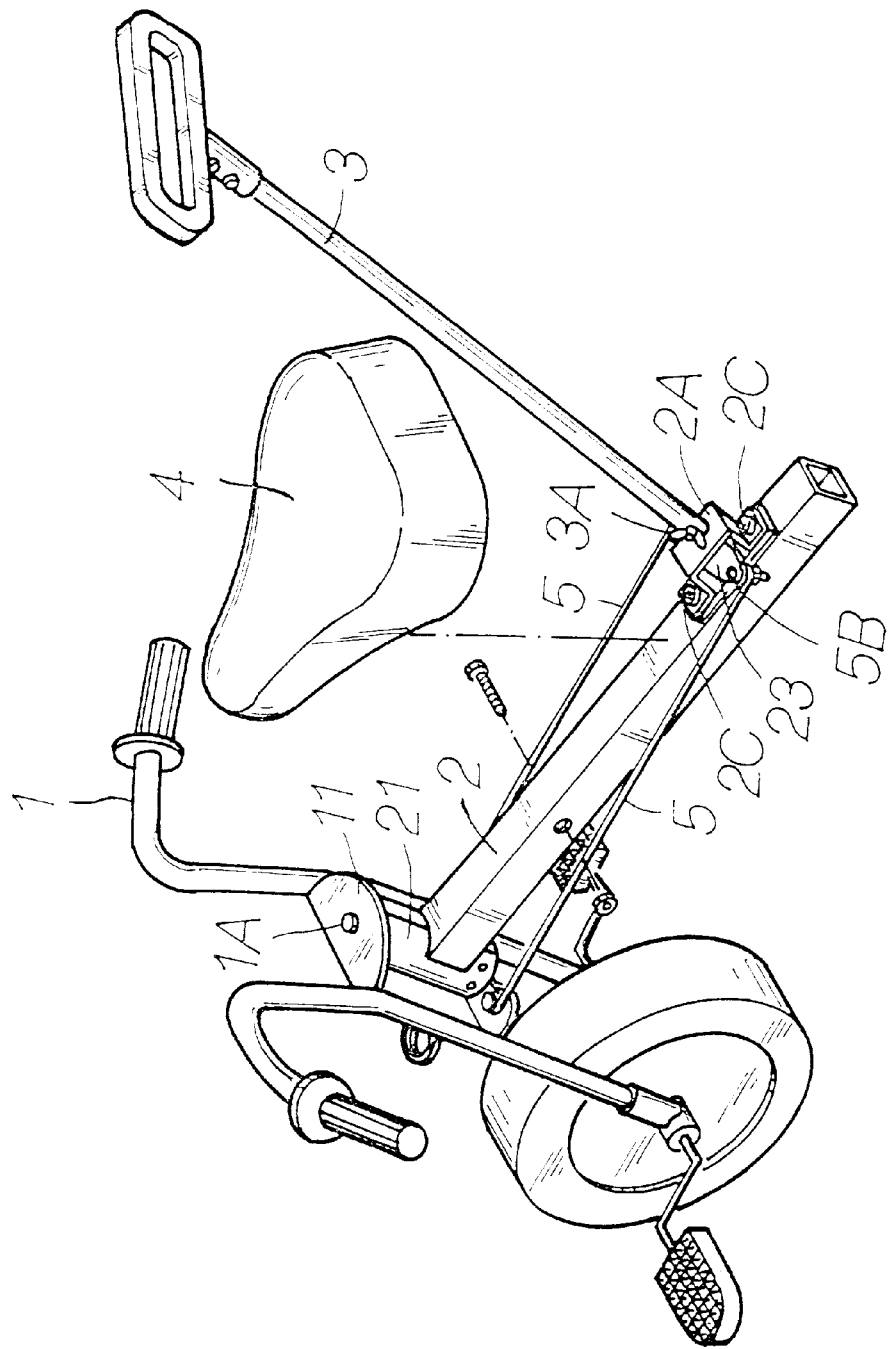
FIG.3-A

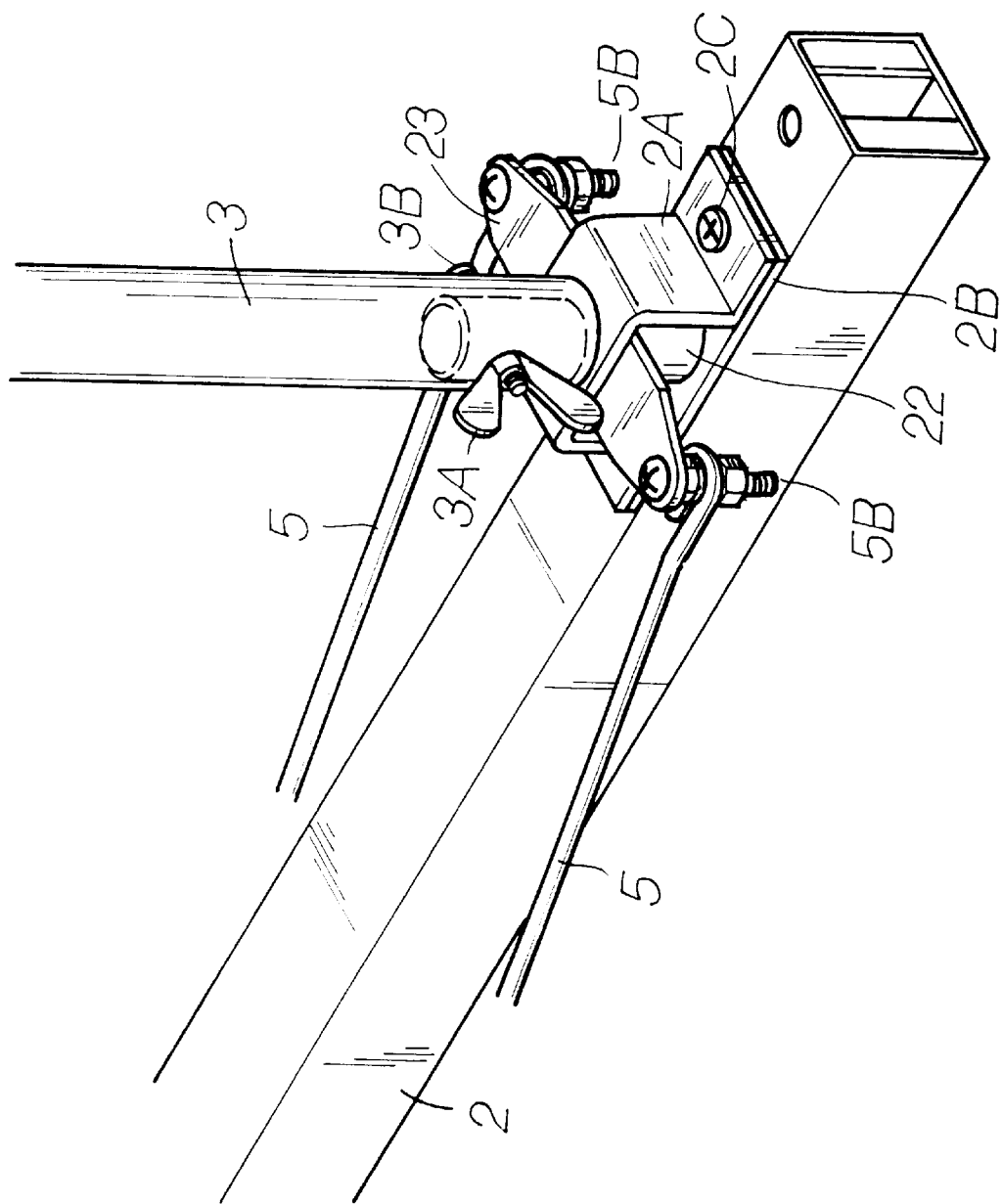
FIG. 3-B

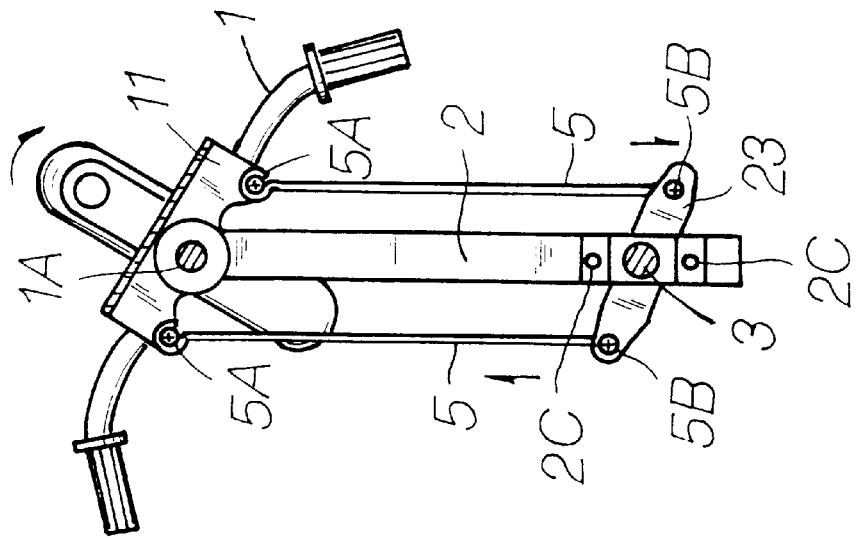
FIG. 4-B
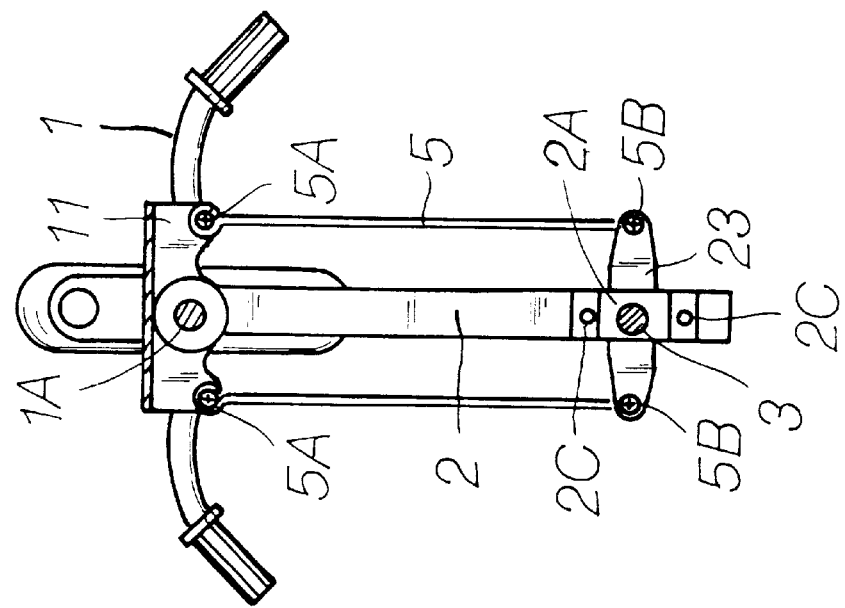
FIG. 4-A

AUXILIARY STEERING ASSEMBLY FOR A TRICYCLE

FIELD OF THE INVENTION

The present invention relates generally to a tricycle and more particularly to an auxiliary steering device intended for use in assisting a child to learn to ride a tricycle.

BACKGROUND OF THE INVENTION

As shown in FIG. 1, a prior art tricycle "A" is intended for a child and is made up of a body frame by welding. The tricycle "A" has a handlebar A1 which is connected with a rear frame A2 by a support frame A3 the rear frame A2 is composed of a tubular frame A21 which is provided with an insertion seat A22 for mounting a holding frame A4. Such a prior art tricycle as described above is disadvantageous in design in is rather complicated in construction, and lacks an auxiliary steering device enabling an adult to teach a child to ride the tricycle with ease and without back pain.

SUMMARY OF THE INVENTION

The primary objective of the present invention is therefore to provide a tricycle with an auxiliary steering device enabling an adult to teach a child to ride the tricycle with ease and without back pain.

In keeping with the principle of the present invention, the foregoing objective of the present invention is attained by an auxiliary steering device, which is fastened with a rear frame of the tricycle and is composed of a rear handlebar enabling an adult to manipulate the steering of two front handlebars of the tricycle. The rear handlebar is fastened at the bottom end thereof with the rear frame of the tricycle such that the rear handlebar is connected with the front frame of the tricycle by means of two connection rods.

The foregoing objective, features, functions and advantages of the present invention will be more readily understood from of the following detailed description of an embodiment of the present invention with reference to the accompanying drawings.

BRIEF DESCRIPTION OF THE DRAWINGS

FIG. 3A shows a partial perspective view of the present invention.

FIG. 3B shows a partial enlarged view of the present invention.

FIG. 4A shows a top view of the present invention.

FIG. 4B shows a top view of the present invention in operation.

DETAILED DESCRIPTION OF THE EMBODIMENT

Figure 1:
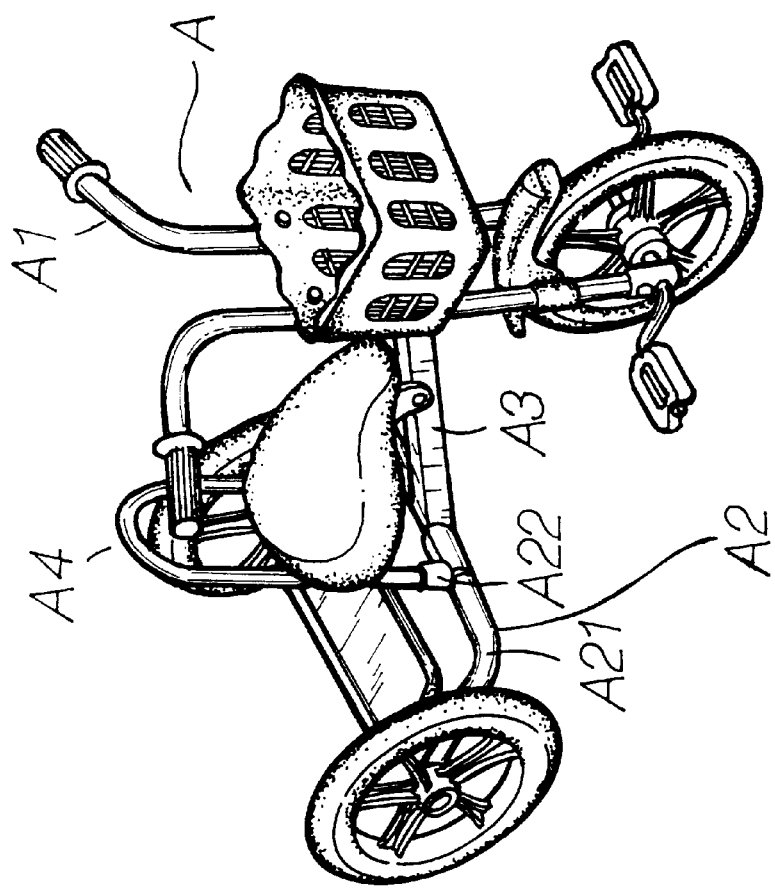
FIG. 1 shows a perspective view of a children's tricycle of the prior art.
Figure 2:
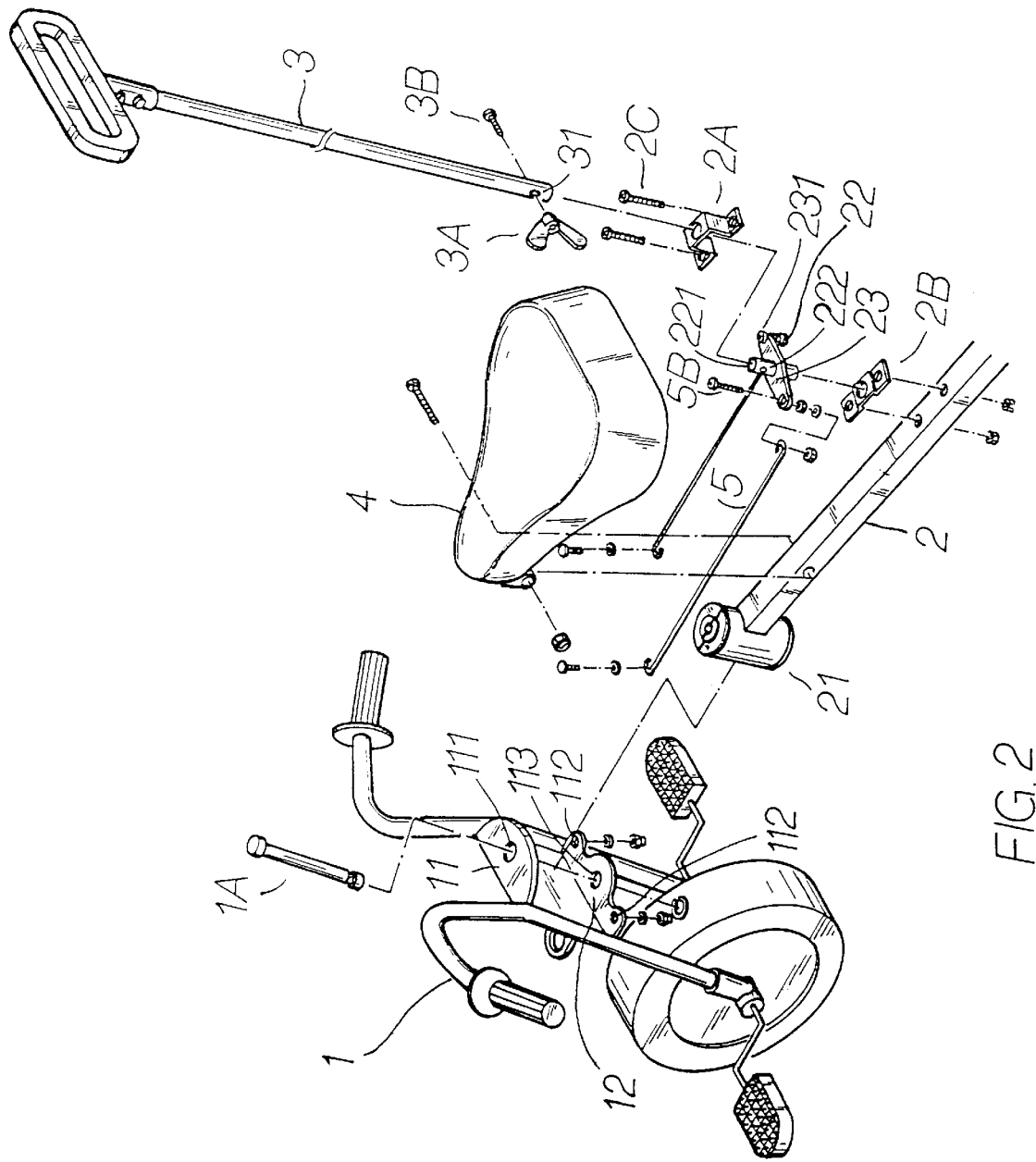
FIG. 2 shows an exploded perspective view of a children's tricycle of the present invention.

As shown in FIGS. 2, 3A and 3B, a tricycle of the embodiment according to an present invention is composed of a front frame 1 a rear frame 2 an auxiliary steering device 3, and a seat 4.

The front frame 1 is mainly composed of two handlebars which are held together by two connection pieces 11 and 12. The upper connection piece 11 is provided at the center thereof with a center hole 111, whereas the lower connection piece 12 is provided with two side holes 112 and a center hole 113.

The rear frame 2 is provided at the front end thereof with a connection seat 21, which is engaged with the front frame 1 such that the connection seat 21 is pivotally secured between the upper and the lower connection pieces 11 and 12 by means of a fastening bolt 1A which is received in the center holes 111 and 113 of the connection pieces 11 and 12. A seat 4 is mounted on the rear frame 2.

The auxiliary steering device 3, including a rod having a handle at an upper end thereof, is mounted on the rear end of the rear frame 2, on which fastening pieces 2A and 2B are provided 2B for fastening the seat mount 22 with the rear end of the rear frame 2. The seat mount 22 has a retaining portion 221 with a threaded hole 222. The fastening pieces 2A and 2B are fastened with the rear end of the rear frame 2 by means of two fastening screws 2C. The auxiliary steering device 3 is of a long rodlike construction and is provided at the bottom end thereof with a through hole 31. The bottom end of the device mount 3 is engaged with the retaining portion 221 of the device seat mount 22 by threaded hole 222 of the retaining portion 221. The cruciform seat mount 22 has two cross arms 23 each having a retaining hole 231 for pivotally engaging the rear end of a connection rod 5 by means of a bolt 5B. Each connection rod 5 is pivotally secured at the front end thereof with one of the two side holes 112 of the lower connection piece 11 of the front frame 1 by a bolt 5A.

As illustrated in FIGS. 4A and 4B, the steering of the two handlebars of the front frame 1 can be easily controlled by an adult manipulating the auxiliary steering device 3 by selectively rotating the rod and thereby pivoting the cross arms in opposite directions.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A tricycle and auxiliary steering assembly comprising:
   a) a front frame including a pair of handlebars for providing a primary steering device for the tricycle, a pair of spaced upper and lower connection pieces securing the handlebars together, the upper connection piece having a center hole formed therethrough, the lower connection piece having a center hole and a pair of side holes formed therethrough;
   b) a rear frame including a front end and a rear end, the front end being pivotally secured to the upper and lower connection pieces, a seat mounted to the rear frame;
   c) an auxiliary steering device including a rod having an upper end and a lower end, a handle secured to the upper end, a seat mount secured to the rear end of the rear frame, the seat mount including a pair of cross arms, the lower end of the rod being rotatably secured to the seat mount for selectively pivoting the cross arms in opposite directions;
   d) a pair of connecting rods, each connecting rod including a front end pivotally connected to a side hole of the lower connecting piece and a rear end pivotally connected to a cross arm; and
   e) wherein when a user rotates the rod by manipulating the handle, the cross arms are caused to pivot in opposite directions and thereby steer the front frame in corresponding left and right directions.

* * * * *